United States Patent [19]
Kelly

[11] Patent Number: 6,044,154
[45] Date of Patent: Mar. 28, 2000

[54] REMOTE GENERATED, DEVICE IDENTIFIER KEY FOR USE WITH A DUAL-KEY REFLEXIVE ENCRYPTION SECURITY SYSTEM

[75] Inventor: Tadhg Kelly, Clifton, N.J.

[73] Assignee: Communications Devices, Inc., Clifton, N.J.

[21] Appl. No.: 08/937,547

[22] Filed: Sep. 24, 1997

Related U.S. Application Data

[63] Continuation-in-part of application No. 08/331,975, Oct. 31, 1994, Pat. No. 5,636,280, which is a continuation-in-part of application No. 08/559,312, Nov. 15, 1995, abandoned.

[51] Int. Cl.[7] ............................................. H04L 9/32
[52] U.S. Cl. ................................. 380/25; 380/21
[58] Field of Search ..................... 380/21, 25; 708/229; 713/201

[56] References Cited

U.S. PATENT DOCUMENTS

| | | | |
|---|---|---|---|
| 4,238,853 | 12/1980 | Ehrsam et al. ................ | 380/25 X |
| 4,652,698 | 3/1987 | Hale et al. ..................... | 380/24 |
| 4,933,971 | 6/1990 | Beestock et al. ............... | 380/44 |
| 5,196,840 | 3/1993 | Leith et al. .................... | 340/825.3 |
| 5,202,840 | 4/1993 | Iijima ............................ | 380/45 |
| 5,434,918 | 7/1995 | Kung et al. .................... | 380/25 |

*Primary Examiner*—Gilberto Barrón, Jr.
*Attorney, Agent, or Firm*—Siegmar Silber, Esq.

[57] ABSTRACT

A security system is disclosed, which system is for granting access to a host computer in response to a demand from a remote computer. The security system has a permanent encryption key mounted on the remote computer. The software portion of the system provides for the identification number associated with the permanent encryption key to be sent unencrypted to the host computer. Using the identification number the host computer selects an encryption device and encrypts a transitory encryption key generated by the host computer and transmits the transitory encryption key to the remote for emplacement on a write-only receptor in the permanent encryption key. Thereafter a comparator in the host computer, in response to encrypted identifying data transmitted from the remote computer and encrypted with said the transitory encryption key, authenticates the access demand. Access is granted by the host computer to the remote computer upon the favorable comparison of an encrypted identifier provided by the remote computer.

19 Claims, 7 Drawing Sheets

REMOTE GENERATED, DEVICE IDENTIFIER KEY FOR USE WITH A DUAL-KEY REFLEXIVE ENCRYPTION SECURITY SYSTEM

CROSS-REFERENCE TO RELATED CASES

This Application is a continuation-in-part of an application entitled DUAL-KEY REFLEXIVE ENCRYPTION SECURITY SYSTEM bearing Ser. No. 08/331,975, filed Oct. 31, 1994, now U.S. Pat. No. 5,636,280, which is a cip of Application entitled Remote Generated, Device Identifier Key for Use with a Dual-Key Reflexive Encryption Security System bearing Ser. No. 08/559,312, filed Nov. 15, 1995 abandoned.

BACKGROUND OF THE INVENTION

1. Field of the Invention

This invention relates to a remote generated, device identifier key which is usable with systems such as the dual-key reflexive encryption security system. More particularly, the invention is of a data security system having in the access seeking remote device, such as a lap top computer, an identifier key program for encrypting a personal key and an embedded encrypted token with various communicated control messages, including those for key management and session keys, accomplished in encrypt.

2. Background of the Prior Art

In the past, various secure access systems or methods have been devised using a token—a physical object or hardware device that a user has in his possession when dialing into a computer. Various types of tokens are available using different schemes, among which are time-based identification and calculator-type tokens.

The time-based token is contained in a hand-held device (the token) with a small window containing an identifying number. This number changes about every 3 minutes. When signing on to a database, the security equipment is programmed to request the user's identification information. The identification of the user is linked to the token by an algorithm, and, when the identifying information is received, the security device obtains the corresponding algorithm for the specific token. During operation of the token, the algorithm is processed and generates identifying information which appears in the window of the token and changes every 3 minutes. When in response to a request for access, the same number (or, to allow for time differences, the past number or the next future number) is present at the token and at the security equipment guarding the database, access is provided to the user. All the transactions between the user and security device are public transmissions and are not encrypted.

In the calculator-type token, the user presents identifying information and optionally a password to the security equipment guarding the database and, in return, the security equipment sends a number to user. Then, the user keys the returned data into the calculator-type token which, using an algorithm, processes the data so that a different number appears in the window of the token. This number is sent by the user to the security equipment and, if the numbers both having passed through the same algorithm match, the user is allowed access to the database. All these transactions are public transmissions and are not encrypted. Some of the calculator-type tokens use the data encryption standard (DES) as the algorithm, with each calculator-type token having an individual key, but all data transmitted to and from the user to the security equipment is in the clear.

In addition to the above background information and in the course of preparing for this application, several patents became known to the inventor hereof. These patents are shown in the tabulation below.

| ITEM NO. | U.S. PAT. NO. | INVENTOR | ISSUE DATE |
|---|---|---|---|
| 1 | 5,237,614 | Weiss, K. F. | 08/17/93 |
| 2 | 5,175,766 | Hamilton, S. B. | 12/29/92 |
| 3 | 5,138,712 | Corbin, J. R. | 10/21/75 |

In considering the various patents known to the inventor hereof the following discussion is provided:

U.S. Pat. No. 5,237,614—Weiss, K. F.

The patent to Weiss shows an integrated network security system which permits a log-on to a normally locked client on the network in response to at least one encryptd non-public input to the client by a user. At least a selected portion of the encryptd input is encrypted and sent to a network server where the user is authenticated. After authentication, the server preferably returns a decryption key, an encryption key for future use and any critical files previously stored at the server to the client. The decryption key is utilized to decrypt any material at the client which were encrypted when the client was locked, including any material sent from the server, thereby unlocking the client. The decryption key may be combined with untransmitted portions of the original encryptd input in a variety of ways to generate an encryption key for the next time the terminal is to be locked. When one of a variety of client locking conditions occurs, the previously generated encryption key is utilized to encrypt at least selected critical material at the client. Critical directories or the like in encrypted form may be sent to the server and a message is sent to the server that the client is locked, which message is utilized by the server to inhibit the client from further access to at least selected resources on the network.

U.S. Pat. No. 5,175,766—Hamilton. S. B.

The Hamilton patent discloses a method of communicating with a data encryption device. A data encryption device adapted for providing encryption functions such as data encryption and decryption may be controlled with an inventive signaling protocol which provides two-way symmetrical messaging. Data encryption messages are sent to a data encryption device with a message packet which includes a start of message character, a token field, a token dependent data field, a token delimiter and an end of message character. A response message is generated after the data encryption function is performed, with the exception that the token dependent data comprises data which was processed in accordance with the requested function.

U.S. Pat. No. 5,138,712—Corbin. J. R.

The patent to Corbin teaches a software application with verification and license check out functions which are normally performed by a license server of a network software license system. The encrypted license information is contained in a license token, and is sorted in the database controlled by the license server. In contrast to systems in which the license server either grants or denies the request after verifying the user's credentials, the Corbin patent teaches a license server system which finds the correct license token for the software application and transmits the license token to the licensing library. In application specific license access module attached to the application deencrypts the licensing token. Before updating the license token, the license status is checked by routines in the licensing library that are coupled to the software application and verify the license information. The application specific license access module then enencrypts the updated license token before returning it to the license server. Thus, the impact of breaching the encryption/decryption of an application is limited to only one application. As a result, improved network-wide protection against unauthorized use of software applications in a network of computers is provided.

With the various types of tokens discussed above, namely, the time-based identification and calculator-type tokens, several technical problems remain. In the time-based approach, during the time a user is attempting to sign on, there is a three-minute window for an eavesdropper who could have intercepted the data, to place a call to another database in the same network which is protected by the same security equipment. The eavesdropper is now armed with knowledge of the identifying information; where applicable, the password; and, the required response upon a challenge. All of this information has been publicly sent and is readily obtained. As specific networks or companies customarily use the same security equipment at different locations to protect the databases, each location has the same directory of users with the same identifying information and passwords and each location has the same user algorithm embedded within the security equipment.

In the case of the calculator-type token, here the technical problem is somewhat similar inasmuch as the eavesdropper can also intercept the flow of data between the caller and security equipment. Upon doing so, the eavesdropper can uncover the user identifying information, the password and the number-to-be-keyed into the calculator along with the result (the response). With the number-to-be-keyed and the response, a computer program can be developed to derive the DES key for the resulting encryption.

The inclusion herein of the above-listed patents is not intended as an admission that any such patent constitutes prior art against the claims of the present application. Applicant does not waive any right to take any action that would be appropriate to antedate or otherwise remove any listed patent as a competent reference against the claims of the present application.

SUMMARY

In general terms, the invention disclosed hereby includes a security system for granting access to a host computer in response to a demand from a remote computer. The security system has a permanent encryption key mounted on the remote computer. The software portion of the system provides for the identification number associated with the permanent encryption key to be sent unencrypted to the host computer. Using the identification the host computer selects an encryption device and encrypts a transitory encryption key generated by said host computer and transmits the transitory encryption key to the remote for emplacement on a write-only receptor in the permanent encryption key. Thereafter a comparator in the host computer, in response to encrypted identifying data transmitted from the remote computer and encrypted with said the transitory encryption key, authenticates the access demand. Access is granted by the host computer to the remote computer upon the favorable comparison of an encrypted identifier provided by the remote computer.

OBJECT AND FEATURES OF THE INVENTION

It is an object of the present invention to provide a system for more secure technique for data access.

It is a further object of the present invention to provide a system of encrypted communications for access clearance purposes.

It is yet another object of the present invention to provide an embedded token, the algorithm of which is not communicated in the clear during the clearance process.

It is still yet another object of the present invention to provide a data security system with integrated advanced modem management capabilities.

It is a feature of the present invention that the key management communications are encrypted.

It is another feature of the present invention that the session key communication is encrypted.

Other objects and features of the invention will become apparent upon review of the drawings and the detailed description which follow.

BRIEF DESCRIPTION OF THE DRAWINGS

In the following drawings, the same parts in the various views are afforded the same reference designators.

DESCRIPTION OF THE PREFERRED EMBODIMENT

The proprietary software of this invention has two portions, namely, the authentication portion at one or multiple central sites termed herein "host computers" and a software driver portion at each of the access-seeking sites termed herein "remote computers". The host and remote computers are usually connected by dial up modems. The remote computers are equipped with the previously mentioned software along with an encryption program, such as a DES program, and a device-data-derived ($D^3$) key generator. The remote computer software is a software driver that communicates between a standard communications package and the DES program. In the system, the remote computer software is first used to ascertain security system presence before the communications program is engaged. Upon installation of the software, the security system is initialized, and here the remote computer software utilizes a PIN (Personal Identification Number) number locally to verify the user to the program. The user is not informed at this time if the PIN fails so as not to provide clues to an eavesdropper or a potential intruder. The authentication process described in detail below then ensues.

While the $D^3$ key of this invention is explained herein as operating within the security system known as the Dual-Key Reflexive Encryption System, described in U.S. Pat. No. 5,636,280, such a milieu is exemplary and does not restrict the use of the $D^3$ key in other security system settings. The $D^3$ key generator, described hereinbelow, generates the $D^3$ key on an as-needed basis. Thus, as the $D^3$ key is merely a reproducible encrypting agent, it is not stored in any memory and cannot be accessed. Here, as in the parent application, dual-key reflexive encryption is defined as a method or means of encryption in which two encrypting/decrypting keys are used, the first encrypting/decrypting key being permanent to each of two or more stations requiring secure communications and the second encrypting/decrypting key being transitory and being generated for the transaction underway, and further the transitory key is sent encrypted by the permanent key to the station requesting access, which station decrypts the transitory key, and reflexively encrypts data known to both stations, and retransmits the reflexively encrypted data for decoding and comparison at the other station. In this case, device data is information stored in a computer from which an identifier or device "fingerprint" can be generated, such data includes, Inter alia, a serial number embedded in the hard drive and boot sector information.

Figure 1:
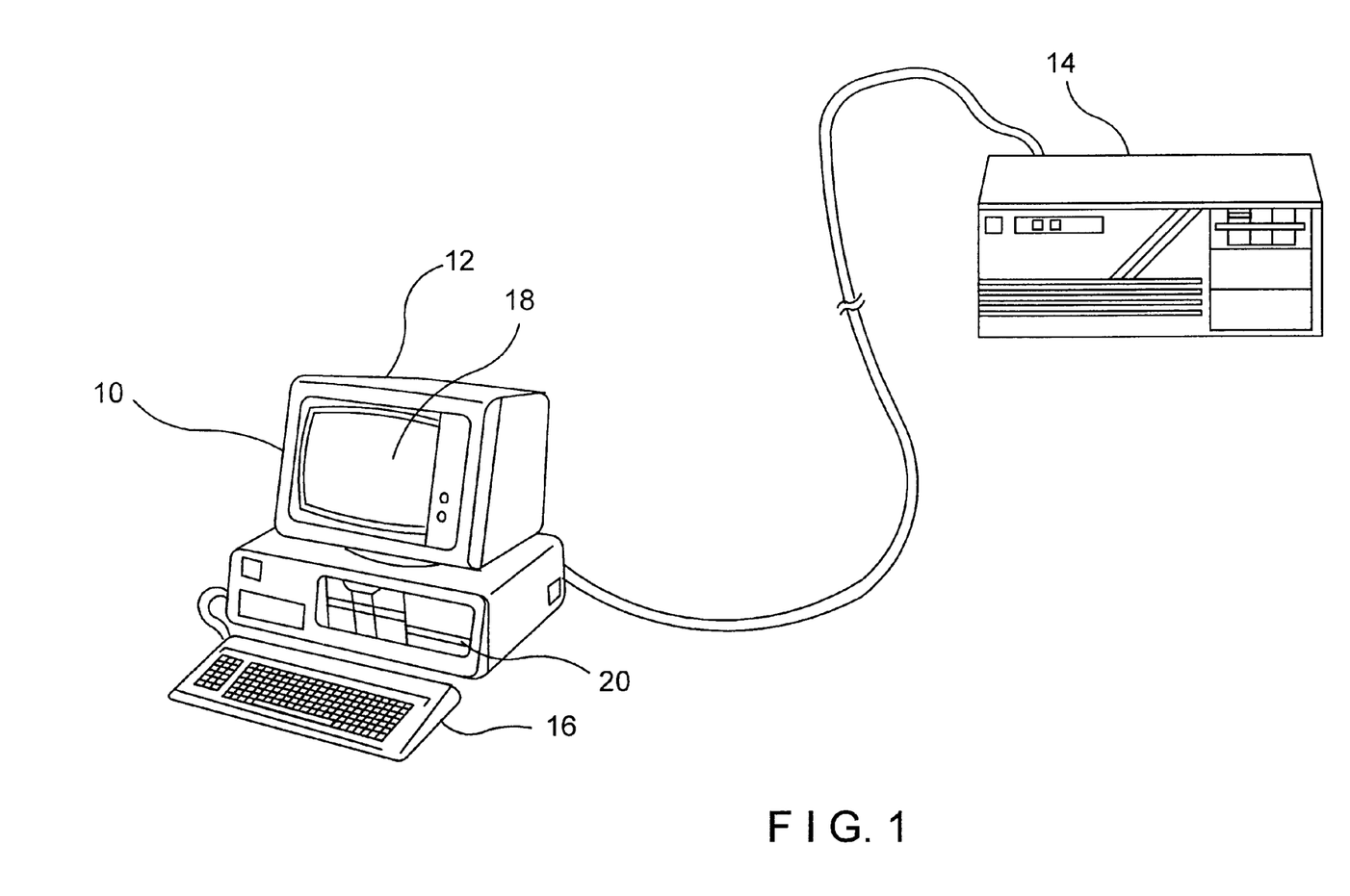
FIG. 1 is a perspective view of the dual-key reflexive encryption security equipped with a device-data-derived ($D^3$) key system of the present invention, showing the remote computer with device data, the interconnecting devices, and the host computer containing the protected database and the communications network therefor.

A security device of this invention is shown in FIG. 1 and is referred to generally by the numeral 10. The device together with the proprietary software and the method of use thereof, described in detail hereinbelow, provides an innovative security and computer access management system for all types of computer-based communications systems. The system includes a remote computer 12 and a host computer 14 with encrypted data flowing therebetween. The security device 10 is structured with the proprietary software thereof installed within the computers of the system. A computer keyboard 16 is provided for data input and a monitor or matrix display 18 is provided for data display. Device data, including serial number and boot sector information, is embedded within hard disk unit 20, which unit is associated with and is a portion of remote computer 12. A DES (data encryption standard) program and the management software (described hereinbelow) are arranged to provide for cooperative functioning with host computer 14. Although a DES program is indicated herein, any encryption program can be employed which is compatible with the software programs.

Figure 2:
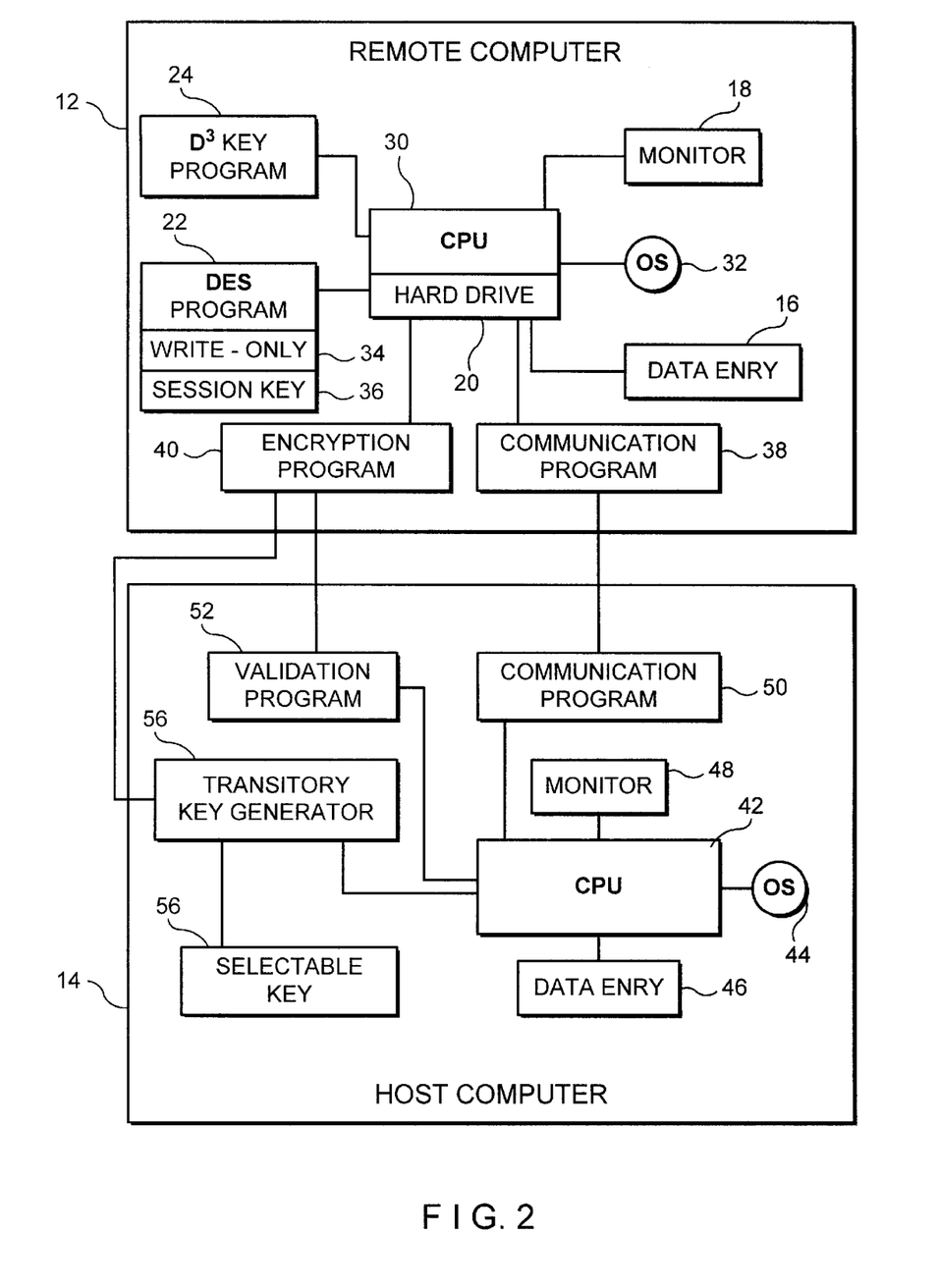
FIG. 2 is a system block diagram of the dual-key reflexive encryption security system equipped with a $D^3$ key of the invention shown in FIG. 1.

Referring now to FIG. 2, a system block diagram is shown with the remote computer 12 thereof having a central processing unit (CPU) 30 supported by an operating system 32. For data entry, the CPU 30 has an associated keyboard 16 and, for display purposes, a monitor 18. The CPU 30 has an associated hard drive 20 which has embedded therewithin device data, see infra., and has a DES program 22 and a $D^3$ key program 24, as shown. The DES program 22 has a write-only portion 34 onto which a transitory or session key 36 is emplaced. For purposes of the specification which follows the term "session key" means a transitory encryption key generally used for a single transaction. Installed in the CPU 30, is a communications program 38 for initiating and maintaining communications between computers 12 and 14 and an encryption or key management program 40 which is a software driver for managing the information flow between the communications program 38 and the DES program 22. The lower portion of the block diagram shows the host computer 14 which has a host computer CPU 42 supported by the operating system 44. For data entry, the CPU 42 has a data entry device or associated keyboard 46; and, for display purposes, a monitor 48. Installed in the CPU 42, is a communications program 50 which, once access is provided functions cooperatively with communications program 38 and a validation or authentication program 52. In the course of validation as is described below, a selectable encryption key 54 and a transitory encryption key generator 56 are controlled by validation program 52.

Referring now to FIGS. 3, 3A, 3B, 4 and 5, the flow diagrams for the security system of this invention are now shown. The logic that follows reflects the user inputs and the programmed processes. The logical pathway commences with power being supplied to the CPU 30 at START block 82, FIG. 3. Upon power being supplied to the CPU 30, the security program is selected at the menu therefor and at START WINGUARD block 84. The security program within the remote computer is optionally one conforming to the data encryption standard (DES) or an equivalent thereof. As will be seen hereinbelow the equivalency requirement includes the ability to generate a $D^3$ key and to verify locally, that is, at the remote computer, the PIN number thereof. The program verifies initialization at HAS $D^3$ KEY PROGRAM BEEN INITIALIZED? block 86. If initialization has not occurred, the user receives notification thereof and proceeds to INITIALIZE TOKEN block 88.

Figure 3:
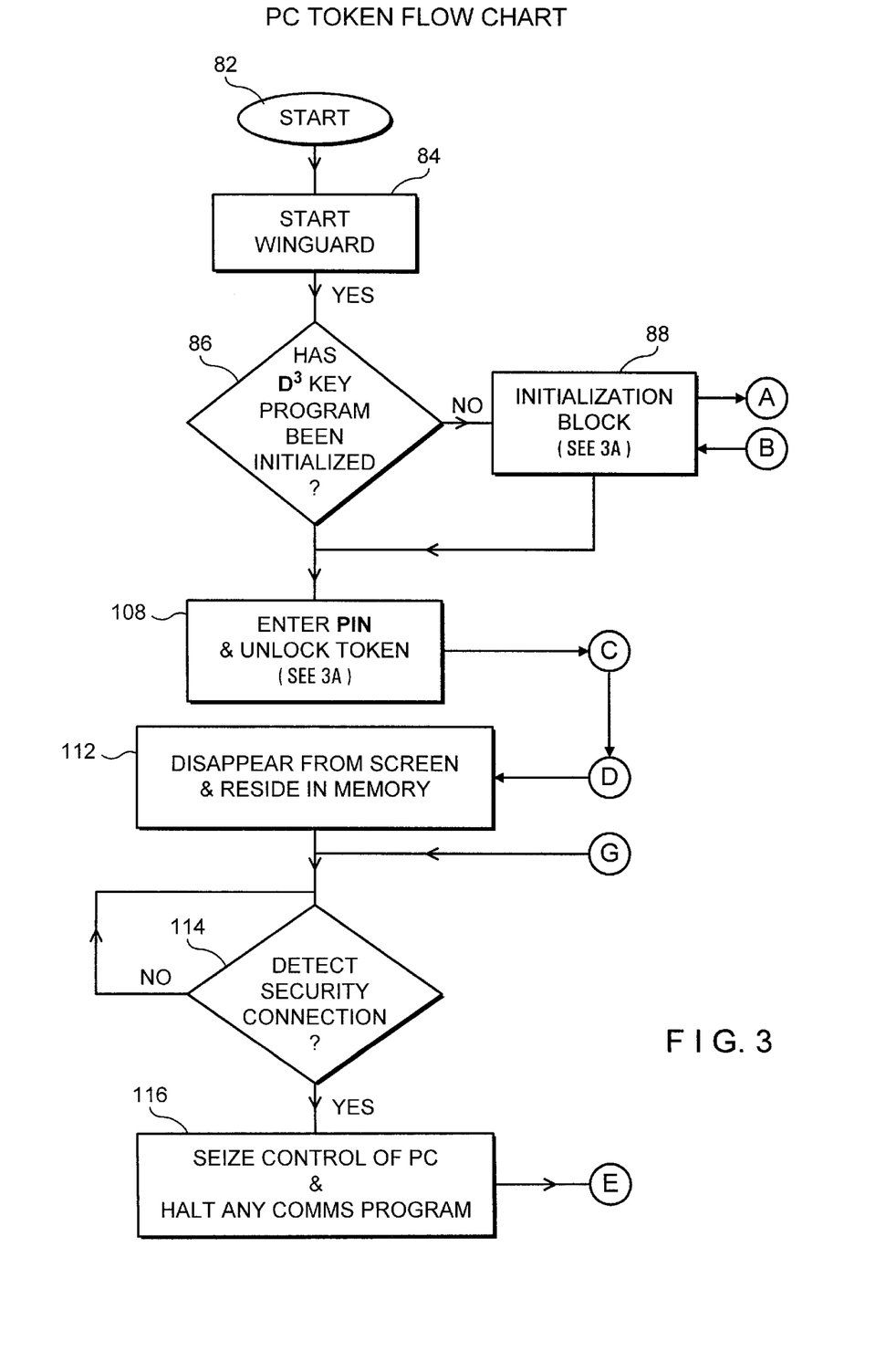
FIG. 3 is a partial flow chart showing the entry portion of the security program, including the $D^3$ key program, of the system shown in FIG. 2 and the interrelationships thereof to the remaining partial flow charts.
Figure 3A:
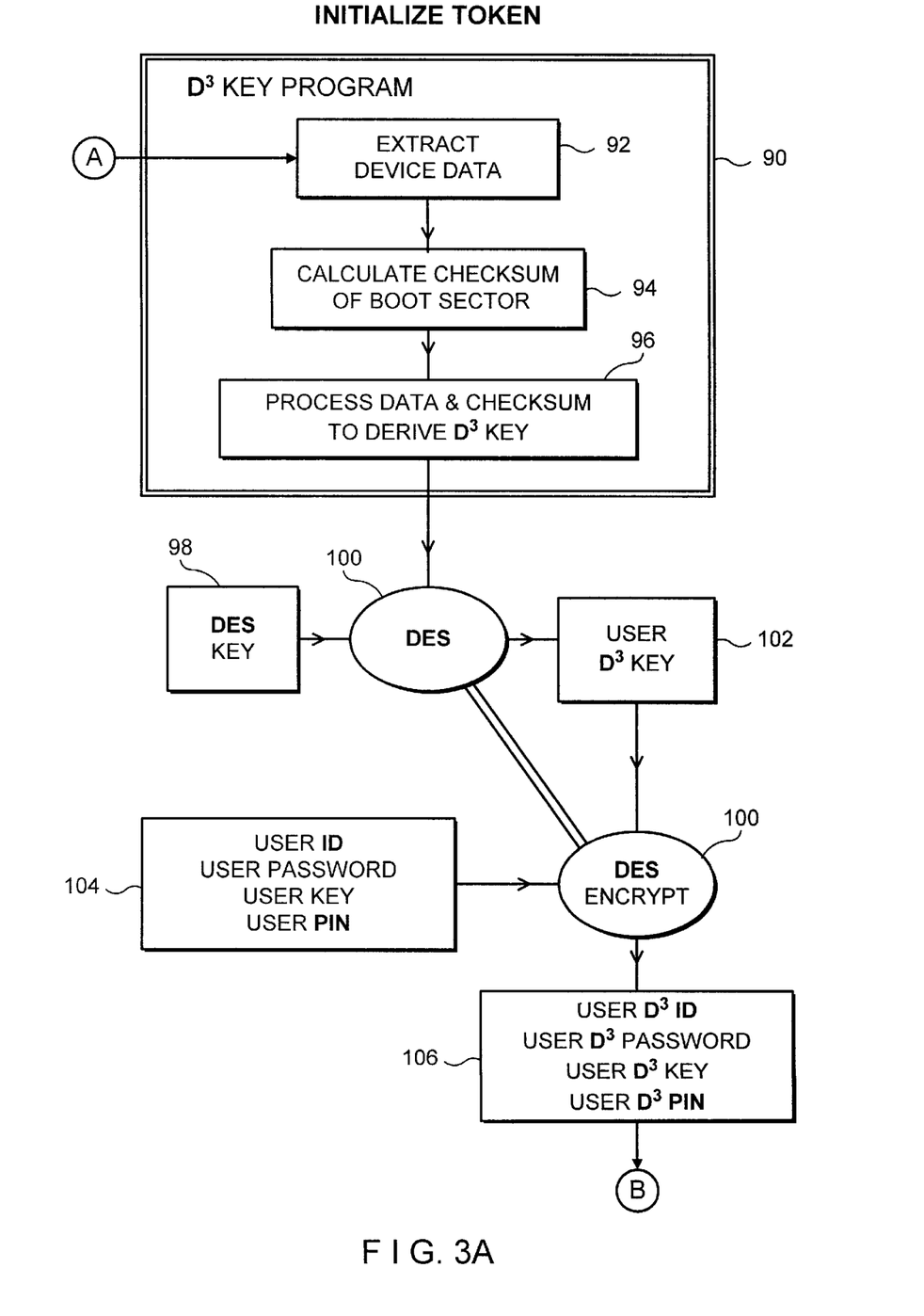
FIG. 3A is a partial flow chart showing the initialization of the $D^3$ key and the use of the $D^3$ key by the DES program.

Referring now to FIG. 3A, the generation of the user $D^3$ key by using the $D^3$ KEY PROGRAM block 90 is next described. Initialization usually occurs only once, that is upon installation of the security program, and once installed remains available to the user. In this disclosure, while the key generator program is described as operating in functional relationship with the DES program, see supra, any compatible security program may be employed. First, the $D^3$ key program at the EXTRACT DEVICE DATA block 92 locates and retrieves the serial number of the remote computer hard drive. It is anticipated that as technology progresses, other device information will be individualized and will serve as "fingerprint" data for the remote equipment seeking access. The program then at CALCULATE CHECKSUM OF BOOT SECTOR block 94 examines the boot sector, the result of which is processed with the device data at PROCESS DATA & CHECKSUM TO DERIVE $D^3$ KEY block 96 and a 16 Hex character string or "fingerprint" of the device is generated. This is the $D^3$ key which is then used for further encryption within the DES program and is not stored in the remote computer or anywhere, but is generated as needed. The $D^3$ key is then used within the DES program and, with the DES key provided at DES KEY block 98, the program encrypts the one key with the other at DES block 100 to generate, at USER $D^3$ KEY block 102, an encrypted, individualized user $D^3$ key that is stored on the hard disk. The storage of this on the hard disk does not present a security hazard as it cannot be understood without the availability of the precursor, the $D^3$ key. The program further at DES block 100 now encrypts the user ID, the user password, the user key, and the user PIN at USER ID, USER PASSWORD, USER KEY, USER PIN block 104 and provides at USER $D^3$ ID, USER $D^3$ PASSWORD, USER $D^3$ KEY, USER $D^3$ PIN block 106—an encrypted string which is presented for authentication purposes.

Referring now again to FIG. 3, if initialization has occurred and the encrypted string is not present, the user at ENTER PIN & UNLOCK TOKEN block 108 receives a prompt to enter the PIN and unlock the token with the $D^3$ key.

Figure 3B:
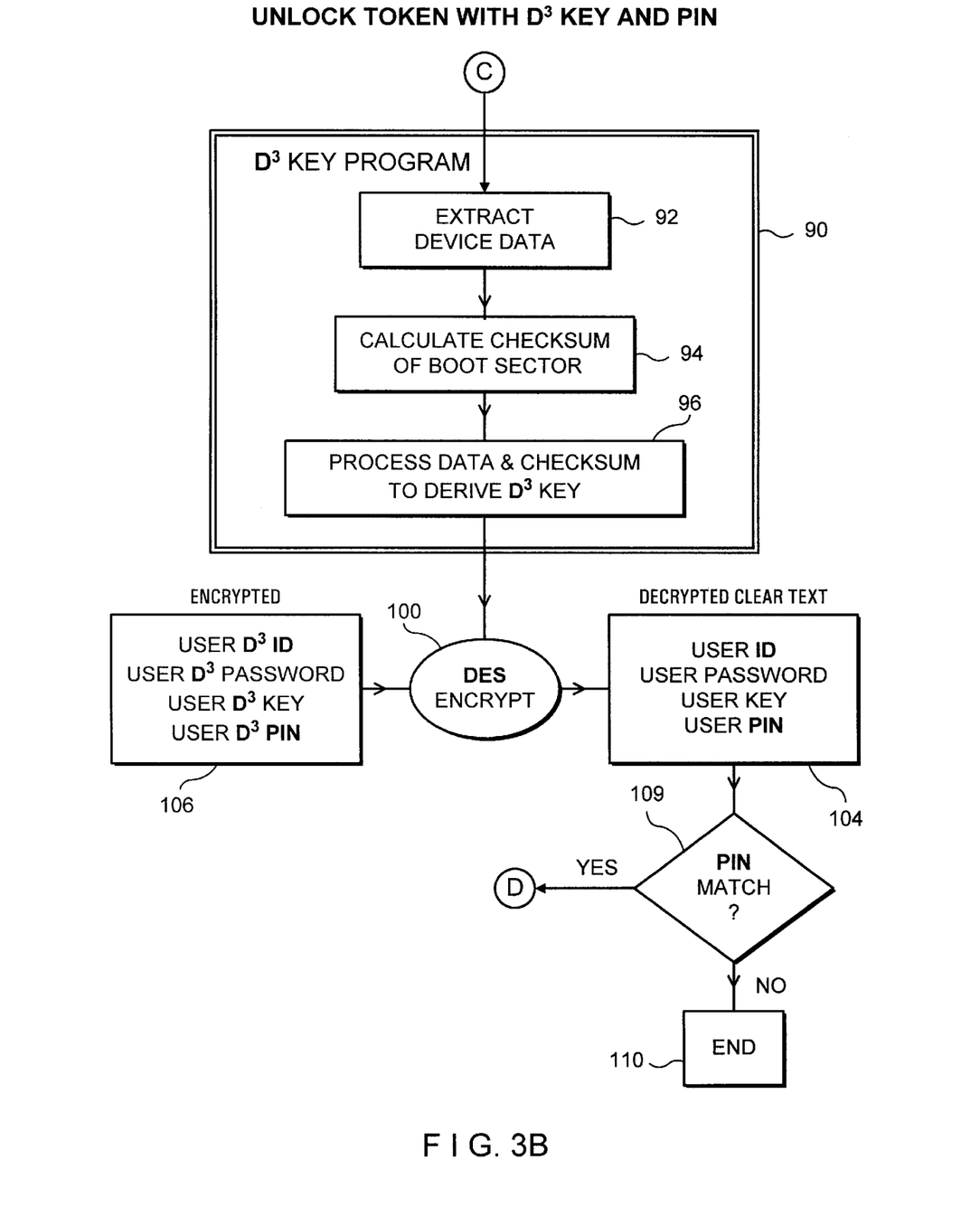
FIG. 3B is a partial flow chart showing the utilization of the $D^3$ key and PIN to unlock the DES token.

Referring now to FIG. 3B, the unlocking of the token with the $D^3$ key and PIN is next described. After entering the PIN at ENTER PIN & UNLOCK TOKEN block 108, the processing continues as described above for the $D^3$ KEY PROGRAM block 90. The $D^3$ key program at the EXTRACT DEVICE DATA block 92 locates and retrieves the serial number of the remote computer hard drive. The program again at CALCULATE CHECKSUM OF BOOT SECTOR block 94 examines the boot sector, the result of which is processed with the device data at PROCESS DATA & CHECKSUM TO DERIVE $D^3$ KEY block 96 and a 16 Hex character string or "fingerprint" of the device is generated. This is the $D^3$ key which is then used for further encryption within the DES program and is not stored in the remote computer or anywhere, but is generated as needed. The $D^3$ key and PIN are then used within the DES program and the encrypted information at the USER $D^3$ ID, USER D PASSWORD, USER$^3$D KEY, USER D PIN block 106 is decrypted at the DES DECRYPT block 100. The result of this processing is decrypted clear text present at USER ID, USER PASSWORD, USER KEY, USER PIN block 104. The user PIN data is then compared at the PIN MATCH block 109 and, if a match is obtained, the program provides for the continuation thereof at FIG. 3. If no pin match is found, the program terminates at END block 110.

Returning now to FIG. 3, with the token unlocked the program has available a decrypted string in clear text. The program of this invention is constructed to operate under two protocols, namely, those systems in which a password is encrypted using a session key and those systems in which challenge data is retransmitted in encrypted form using a session key. Although data entry is described herein as being entered through a keyboard, data entry through other methods, such as a magnetic stripe reader as is commonly encountered at an automatic teller machine (ATM), are also within the teaching hereof. After an appropriate time delay, the display of entered data ceases at the DISAPPEAR FROM SCREEN AND RESIDE IN MEMORY block 112. Thereupon, the program completes the "log on" phase with the detect and seizure procedures at the DETECT SECURITY CONNECTION? and SEIZE CONTROL OF PC AND HALT ANY COMMS PROGRAMS blocks 114 and 116, respectively. This phase is only completed, if the host computer is equipped with a corresponding authentication program and, upon recognition thereof, the progress of the communications programs in place are arrested pending authentication or validation. If the host computer is not similarly equipped, the security system hereof recedes and is transparent to on-going operations.

Figure 4:
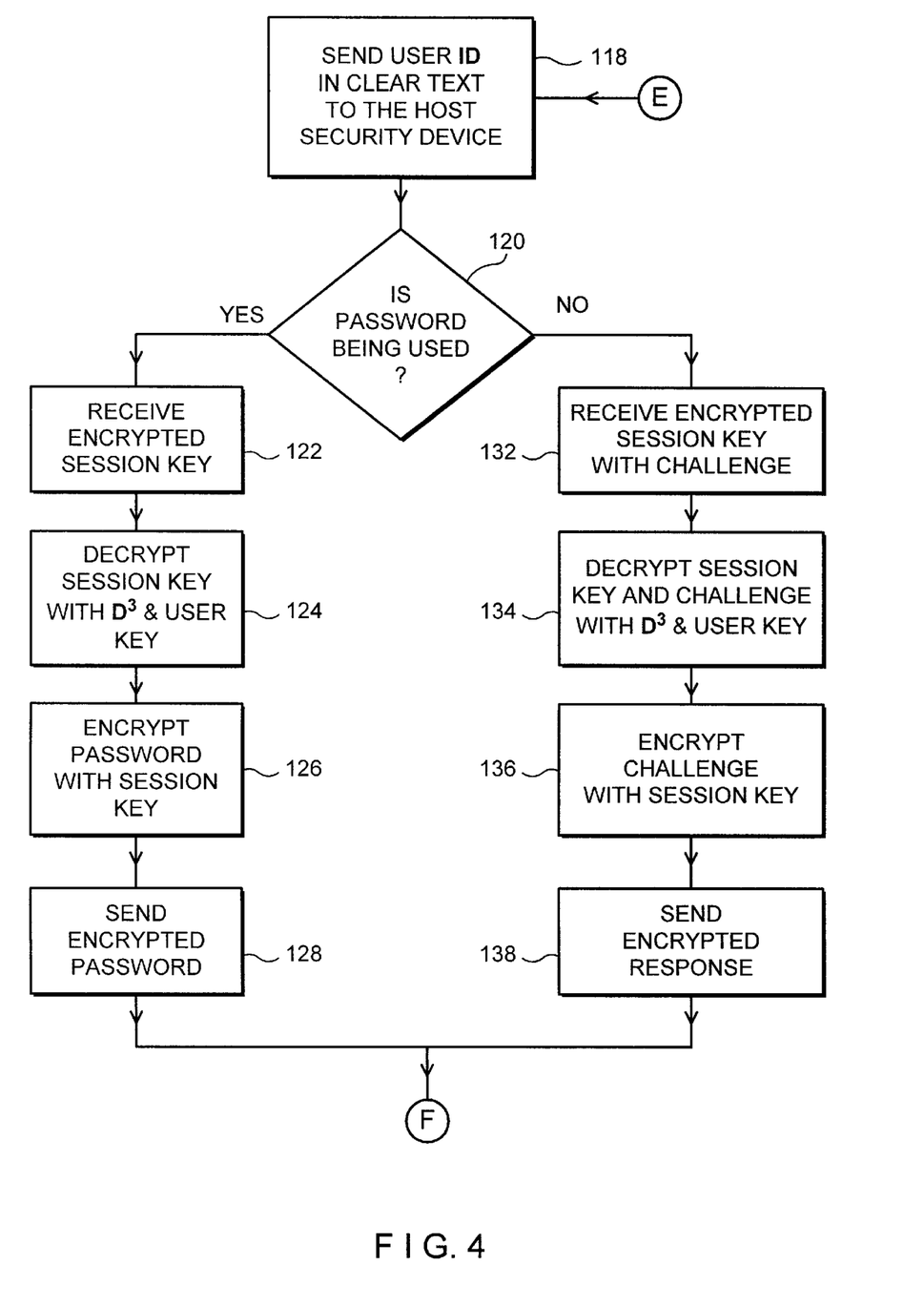
FIG. 4 is a partial flow chart showing the authentication portion of the security program of the system shown in FIG. 2 and the interrelationships thereof to the remaining partial flow charts; and, FIG. 5 is a partial flow chart showing the final portion of the security program of the system shown in FIG. 2 and the interrelationships thereof to the remaining partial flow charts.

Referring now specifically to FIG. 4, the authentication or validation process is next described. The description first follows a pathway in which the password is used and then one in which challenge data is used. An initial clear transmission of identifying data is accomplished in unencrypted form at the SEND USER ID IN CLEAR TEXT TO THE HOST SECURITY DEVICE block 118. Upon the user identification data being received, the security system responds to the query IS PASSWORD BEING USED? block 120. If a password is being used, the host portion of the system generates a session key and having identified the permanent key resident at the remote computer, selects the corresponding key at the host computer and encrypts the session key therewith. This encrypted key is transmitted to RECEIVE ENCRYPTED SESSION KEY block 122 and sequentially is, in turn, encrypted in the $D^3$ key and then placed on the hard drive. At the remote computer, the program hereof is constructed to enable decryption program of the session key at DECRYPT SESSION KEY WITH $D^3$ & USER KEYS block 124 and subsequently to further provide identifying data to the host computer by enabling the encryption of the password at ENCRYPT PASSWORD WITH SESSION block 126. Thereafter, the encrypted portion of the identifying data is sent to the host computer at SEND ENCRYPTED PASSWORD block 128 and the host computer then responds to the query ACCESS GRANTED? block 130. If a password is not being used, the host portion of the system generates a session key with a challenge data stream and having identified the permanent key resident at the remote computer, selects the corresponding key at the host computer and encrypts the session key therewith. This encrypted key is transmitted with the challenge data to RECEIVE ENCRYPTED SESSION KEY W/ CHALLENGE block 132 and is emplaced on the write-only portion of the token. At the remote computer, the program hereeof is constructed to enable decryption of the session key at DECRYPT SESSION KEY WITH $D^3$ & USER KEYS block 134 and subsequently to further provide identifying data to the host computer by enabling the encryption of the challenge data at ENCRYPT CHALLENGE W/ SESSION KEY block 136. Thereafter, the encrypted portion of the identifying data is sent to the host computer at SEND ENCRYPTED RESPONSE block 138.

Figure 5:
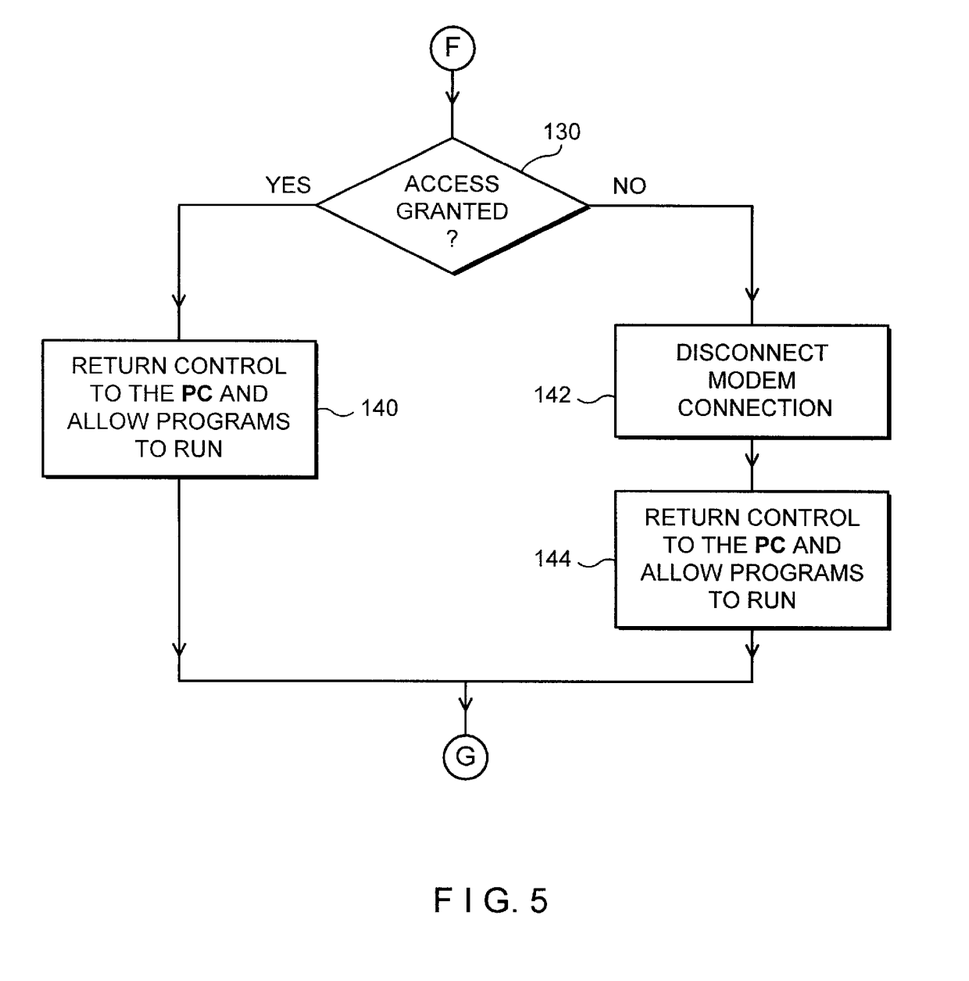

Referring now specifically to FIG. 5 the last phase of the program is shown, the host computer then responds to the query ACCESS GRANTED? block 130. When, after using both the permanent and the transitory keys, either pathway presents reflexively the encrypted identifying data to the host computer, the data is deencryptd and compared to the retained record thereof and a response is rendered. If the comparison at the host computer is favorable, the seizure that occurred at block 116 is terminated and the communications program is now resumed at RETURN CONTROL TO THE PC AND ALLOW PROGRAMS TO RUN block 140. If the comparison at the host computer is not favorable, the access request is denied at DISCONNECT MODEM CONNECTION block 142 and the seizure that occurred at block 116 is terminated by the communications program now being resumed at RETURN CONTROL TO THE PC AND ALLOW PROGRAMS TO RUN block 144.

In operation, security is provided for a host computer by having a sophisticated encryption methodology. The remote computer, in order to participate in the system, is equipped with a dedicated encryption key and an encryption program. The encryption program, upon the remote computer making an access demand on the host computer, functions cooperatively with any communications program. Similarly, the host computer, in order to participate in the system, is equipped with a validating program for authenticating access demands, which includes a selectable encryption key corresponding to the dedicated encryption key. The encryption methodology includes the steps of:

(1) upon making an access demand, detecting by the remote computer the presence of the validating program in the host computer;

(2) entering identifying data into the dedicated encryption key of the remote computer;

(3) interrupting the communications program of the remote computer while the remote computer undergoes authentication processing by the host computer, the authentication processing comprising the substeps of:

(a) sending unencrypted an identification number or account number portion of the identifying data from the remote computer to the host computer;

(b) by use of the selectable encryption key, sending encrypted a session key from the host computer to the remote computer;

(c) by use of the dedicated encryption key, decoding at the remote computer the encrypted session key;

(d) by use of the session key at the remote computer, sending encrypted a password or challenge portion of the identifying data from the remote computer to the host computer;

(e) completing authentication at the host computer by decrypting the second portion of the identifying data and comparing the same to a record thereof;

(4) upon authentication, connecting the remote computer to the host computer; and, (5) resuming the communications program to provide access by the remote computer to the host computer.

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed is:

1. A security system for granting access to a host computer in response to a demand from a remote computer, each said computer having a central processing unit (CPU), an operating system, and device data for identifying an associated portion thereof, said security system comprising:

a data encryption standard (DES) program within said remote computer, said DES program, in turn, comprising:

a first encryption key with an associated identifier in encrypted form in said remote computer;

key initiator means for generating a device-data-derived ($D^3$) key, said key initiator means within said remote computer providing retrieval of said device data, usage thereof to generate said $D^3$ key, said $D^3$ key for decrypting said first encryption key, and transfer of said $D^3$ key to the DES program;

a second encryption key in said host computer providing encrypting/decrypting corresponding to that of said first encryption key, said second encryption key being selected by utilizing said associated identifier of said first key;

a transitory encryption key generated by said host computer, said transitory encryption key for decrypting encrypted identifying data transmitted from said remote computer and for encrypting challenge data for transmission to said remote computer;

comparator means in said host computer for authenticating access demands in response to encryptions of said identifying data and said challenge data transmitted from said remote computer;

whereby access is granted by the host computer to the remote computer upon said unencrypted identifier provided by the remote computer enabling the selection of said selectable encryption key, the encryption therewith of a transitory encryption key and the transmission thereof to said remote computer, and the successful comparison at the host computer of encrypted identifying data encrypted with the transitory key at the remote computer.

2. A security system as described in claim 1 further comprising:

validating program in said host computer for authenticating access demands, said validating program having a transitory encryption; and, an encryption program in said remote computer capable of detecting, upon the occurrence of an access demand, the presence of said validating program in said host computer.

3. A security system as described in claim 2 wherein said unencrypted identifying data is an identification number and said encrypted identifying data is a password.

4. A security system as described in claim 3 wherein said encryption program at said remote computer using said first encryption key, decrypts the transitory key received from the host computer, and, using the transitory key, encrypts the password for reflexive transmission thereof to the host computer, said validating program means authenticating the access demand by decoding the encrypted password and comparing the same to a record thereof.

5. A security system as described in claim 4 wherein said first encryption key is within said data encryption standard (DES) program and wherein after decoding, said transitory key is placed on a write-only portion of said DES program.

6. A security system described in claim 5 wherein said remote computer has installed therein a communications program, wherein upon the remote computer detecting said validating program, the encryption program interrupts said communications program during said authenticating procedures; and, upon authentication, resumes said communications program.

7. A security system as described in claim 1 wherein said unencrypted identifying data is an identification number and said encrypted identifying data is a challenge statement received encrypted from the said host computer using the selectable encryption key.

8. A security system as described in claim 7 wherein said encryption program at said remote computer using said first encryption key, decrypts the transitory key received from the host computer, and, using the transitory key, encrypts the challenge statement for reflexive transmission to the host computer, said validating program means authenticating the access demand by decoding the encrypted challenge statement and comparing the same to a record thereof.

9. A security system as described in claim 8 wherein said encryption key is a data encryption standard (DES) token and wherein after decoding, said transitory key is placed on a write-only portion of said DES program.

10. A security system described in claim 9 wherein said remote computer has installed therein a communications program, wherein upon the remote computer detecting said validating program, the encryption program interrupts said communications program during said authenticating procedures; and, upon authentication, resumes said communications program.

11. A method of providing security for a first computer in a system having a second computer making access demands upon said first computer, each said computer having a central processing unit (CPU), an operating system, and device data for identifying an associated portion thereof, said second computer having installed thereon a device-data derived ($D^3$) key generator, a permanent encryption key, and an encryption program therefor, said first computer having a validating program for authenticating access demands including a selectable encryption key corresponding to said permanent encryption key, said method comprising the steps of:

(1) generating a $D^3$ key using the device data of the second computer;

(2) encrypting the $D^3$ key and storing the resultant encryption thereof in said first encryption key;

(3) upon making an access demand, detecting by the second computer the presence of said validating program in said first computer;

(4) entering identifying data transmitted from said first computer into said permanent encryption key of said second computer;

(5) authenticating said access demand by said first computer by dual-key reflexive encryption transmission including encrypted $D^3$ key from said second computer and by an acceptable comparison of the decrypted form thereof at said first computer;

(6) upon authentication, connecting said second computer to said first computer; and, (7) providing access by said second computer to said first computer.

12. A method as described in claim 11 wherein said identifying data is an identification number and a password.

13. A method as described in claim 12 wherein step (3) further comprises the substeps of:

(a) sending unencrypted an identification member from said second computer to said first computer;

(b) by use of said selectable encryption key, sending encrypted a transitory key from said first computer to said second computer;

(c) by use of said permanent encryption key, decoding at the second computer said encrypted transitory key;

(d) by use of said transitory key at the second computer, sending encrypted said password from said second computer to said first computer; and, (e) completing authentication at the first computer by decrypting said password and comparing the same to a record thereof.

14. A method as described in claim 13 wherein said permanent encryption key is a data encryption standard (DES) token and wherein said transitory key is placed on a write-only portion of said DES program.

15. A method as described in claim 14 wherein said second computer has installed therein a communications program, said method further comprising the step of:

upon the second computer detecting said validating program, interrupting said communications program during said authenticating procedures; and, said method further comprising the step of:

upon authentication, resuming the communications program.

16. A method as described in claim 11 wherein said identifying data is an identification number and a challenge statement.

17. A method as described in claim 16 wherein step (3) further comprises the substeps of:

(a) sending unencrypted an identification number from said second computer to said first computer;

(b) by use of said selectable encryption key, sending encrypted transitory key with a challenge statement from said first computer to second remote computer;

(c) by use of said permanent encryption key, decoding at the second computer said encrypted transitory key;

(d) by use of said transitory key at the second computer, sending encrypted said challenge statement from said second computer to said first computer;

(e) completing authentication at the first computer by decrypting said challenge statement and comparing the same to a record thereof.

18. A method as described in claim 17 wherein said permanent encryption key is a data encryption standard (DES) token and wherein said transitory key is placed on a write-only portion of said DES program.

19. A method as described in claim 18 wherein said second computer has installed therein a communications program, said method further comprising the step of:

upon the second computer detecting said validating program, interrupting said communications program during said authenticating procedures; and, said method further comprising the step of:

upon authentication, resuming the communications program.

* * * * *